(12) United States Patent
Nordbruch

(10) Patent No.: US 10,567,550 B2
(45) Date of Patent: Feb. 18, 2020

(54) METHOD FOR OPERATING A SERVER

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/556,992

(22) PCT Filed: Jan. 28, 2016

(86) PCT No.: PCT/EP2016/051786
§ 371 (c)(1),
(2) Date: Sep. 8, 2017

(87) PCT Pub. No.: WO2016/142100
PCT Pub. Date: Sep. 15, 2016

(65) Prior Publication Data
US 2018/0063285 A1 Mar. 1, 2018

(30) Foreign Application Priority Data

Mar. 11, 2015 (DE) .......................... 10 2015 204 363

(51) Int. Cl.
*H04L 29/08* (2006.01)
*G06F 8/65* (2018.01)
(Continued)

(52) U.S. Cl.
CPC .......... *H04L 67/34* (2013.01); *B60R 16/0232* (2013.01); *G06F 8/65* (2013.01);
(Continued)

(58) Field of Classification Search
CPC ......... H04L 67/06; H04L 67/12; H04L 67/18; H04L 67/34; H04L 41/082; G06F 8/65; G06F 9/46; B60R 16/0232
See application file for complete search history.

(56) References Cited

U.S. PATENT DOCUMENTS 6,085,124 A * 7/2000 Choi .................. G07B 15/02
700/217
7,693,612 B2 * 4/2010 Bauchot .................. G06F 8/65
701/1
(Continued)

FOREIGN PATENT DOCUMENTS

DE 102009045711 A1 4/2010
DE 102011084264 A1 4/2013
(Continued)

OTHER PUBLICATIONS

International Search Report for PCT/EP2016/051786, dated Apr. 20, 2016.

*Primary Examiner* — Davoud A Zand
(74) *Attorney, Agent, or Firm* — Norton Rose Fulbright US LLP; Gerard Messina

(57) ABSTRACT

A method for operating a server, including: establishing a communication connection between the server and a vehicle located in the parking facility via a communication network, the communication network being formed by a communication infrastructure of the parking facility, checking via the communication connection whether a software stored in the processing device of the vehicle must be updated, transmitting, as a function of the check, update data for updating the software to the vehicle via the communication connection using the server so that it is possible to update the software based on the update data while the vehicle is located in the parking facility. Also described is a server, a parking system for vehicles and a computer program.

9 Claims, 1 Drawing Sheet

(51) Int. Cl.
*H04L 12/24* (2006.01)
*B60R 16/023* (2006.01)
(52) U.S. Cl.
CPC ............ *H04L 41/082* (2013.01); *H04L 67/06* (2013.01); *H04L 67/18* (2013.01); *H04L 67/12* (2013.01)

(56) References Cited

U.S. PATENT DOCUMENTS

| | | | |
|---|---|---|---|
| 8,645,014 B1 | 2/2014 | Kozlowski et al. | |
| 8,836,788 B2 * | 9/2014 | Nerayoff | H04N 7/181 348/148 |
| 9,135,803 B1 * | 9/2015 | Fields | B60K 28/066 |
| 9,229,623 B1 * | 1/2016 | Penilla | G06Q 20/18 |
| 9,390,319 B2 * | 7/2016 | Nerayoff | H04N 7/181 |
| 2009/0300595 A1 * | 12/2009 | Moran | G06F 8/65 717/170 |
| 2010/0073201 A1 * | 3/2010 | Holcomb | G08G 1/005 340/990 |
| 2010/0138080 A1 | 6/2010 | Nazione, Jr. et al. | |
| 2011/0215758 A1 | 9/2011 | Stahlin et al. | |
| 2011/0241862 A1 | 10/2011 | Debouk et al. | |
| 2011/0296248 A1 | 12/2011 | Vidal et al. | |
| 2011/0307336 A1 | 12/2011 | Smirnov et al. | |
| 2012/0030470 A1 | 2/2012 | Jdanov et al. | |
| 2014/0006555 A1 * | 1/2014 | Shields | H04L 67/12 709/217 |
| 2014/0032048 A1 | 1/2014 | Obradovich | |
| 2014/0036076 A1 * | 2/2014 | Nerayoff | H04N 7/181 348/148 |
| 2014/0068010 A1 * | 3/2014 | Nicholson | B60K 35/00 709/219 |
| 2014/0068713 A1 * | 3/2014 | Nicholson | H04W 12/06 726/3 |
| 2014/0257943 A1 * | 9/2014 | Nerayoff | G06T 7/292 705/13 |
| 2014/0282470 A1 * | 9/2014 | Buga | G06F 8/65 717/170 |
| 2014/0306833 A1 * | 10/2014 | Ricci | B60Q 1/00 340/901 |
| 2014/0309789 A1 * | 10/2014 | Ricci | B60Q 1/00 700/276 |
| 2014/0310075 A1 * | 10/2014 | Ricci | H04W 4/21 705/13 |
| 2015/0138001 A1 * | 5/2015 | Davies | G08G 1/149 340/932.2 |
| 2015/0215779 A1 * | 7/2015 | Fokkelman | H04W 12/08 726/7 |

FOREIGN PATENT DOCUMENTS

| | | |
|---|---|---|
| JP | 2004299587 A | 10/2004 |
| JP | 2006085350 A | 3/2006 |
| WO | 2013140781 A1 | 9/2013 |

\* cited by examiner

METHOD FOR OPERATING A SERVER

FIELD OF THE INVENTION

The present invention relates to a method for operating a server. The present invention further relates to a server as well as to a computer program.

BACKGROUND INFORMATION

Vehicle inspections including a detailed error analysis and a rectification by software updates are normally performed in workshops at regular intervals, for example at two-year intervals and/or at intervals of 20,0000 kilometers. The analysis is performed by a cable connection via an OBD (on-board diagnosis) plug, which allows for the transfer of greater data quantities.

In the event of greater problems, manufacturers usually launch recalls of the vehicles outside of the inspections.

In the event of smaller and/or non-critical errors known from manufacturers and/or OEM (original equipment manufacturers), software updates are increasingly uploaded to the vehicle via a mobile telephone connection in order to rectify the error. In such mobile telephony connections to the vehicle, communication may be interrupted if a coverage of the mobile telephony network has dead spots or when the vehicle drives into an underground parking garage, for example. It is thus possible for an update of the software in the vehicle to fail.

SUMMARY OF THE INVENTION

An objective of the present invention may therefore be seen as providing an efficient concept that makes it possible reliably to update a software that is stored on a processing device of a vehicle.

This objective may be achieved by the respective subject matter of the description herein. Advantageous developments of the present invention are the subject matter of the further descriptions herein.

According to one aspect, a method for operating a server is provided, comprising the following steps:
establishing a communication connection between the server and a vehicle located in a parking facility via a communication network, the communication network being formed by a communication infrastructure of the parking facility,
checking via the communication connection whether a software stored on a processing device of the vehicle must be updated,
transmitting, depending on the result of the check, update data for updating the software to the vehicle using the server via the communication connection so as to make it possible to update the software based on the update data while the vehicle is located in the parking facility.

According to another aspect, a server is provided, comprising:
a communication interface, which is configured to communicate via a communication network that is formed by a communication infrastructure of a parking facility,
a processor, which is configured to control the communication interface in such a way
that the communication interface establishes a communication connection between the server and the vehicle located in a parking facility via the communication network,
so that it is possible to check via the communication connection whether a software stored on a processing device of the vehicle must be updated,
the processor being configured to control the communication interface as a function of the check in such a way that the communication interface transmits update data for updating the software to the vehicle via the communication connection so that it is possible to update the software based on the update data while the vehicle is located in the parking facility.

According to another aspect, a parking system for vehicles is provided, comprising:
a parking facility,
which has a communication infrastructure,
which is configured to form a communication network, and
a server in accordance with the present invention.

According to another aspect, a computer program is provided, which comprises program code for carrying out the method for operating a server when the computer program is executed on a computer, in particular on the server.

The present invention thus includes in particular and inter alia the idea of using a communication network of a parking facility in order to establish a communication connection to the vehicle. This advantageously makes it possible to check whether a software stored on a processing device of the vehicle must be updated. The present invention furthermore provides for the transmission of update data to the vehicle via this communication connection if the check determined that the software must be updated. For this purpose, the vehicle is located in the parking facility. That is to say that the present invention provides for the vehicle to be located in a defined communication environment, within which there is communication with the vehicle and, if indicated, a software update is performed. Thus, the communication network formed by the communication infrastructure of the parking facility is advantageously used for the communication connection. Such a communication network normally has a more reliable radio coverage within the parking facility that the usual mobile telephony networks. For the communication infrastructure is normally adapted to a topography of the parking facility so that it is possible to achieve a radio coverage sufficient for a reliable communication connection to the vehicle. Even if the communication network should have dead spots within the parking facility, these are easily measured in order to take this circumstance into account when communicating with the vehicle. This is normally easier to accomplish in a parking facility than in a mobile telephony network, which is formed or established outside of the parking facility. For outside of the parking facility there are normally a plurality of unknown parameters that could influence a radio coverage of the mobile telephony network.

Using the communication infrastructure of the parking facility, it is thus advantageously possible to establish a more robust and more reliable communication connection between the server and the vehicle in comparison to the usual mobile telephony connections outside of the parking facility. This then allows advantageously for a more secure and more reliable transmission of the update data to the vehicle. Advantageously, it is thus possible to perform an update of the software in a more secure and more robust manner.

The software comprises for example a program or a set of programs that are used to operate a computer, in particular the processing device.

Software comprises for example one or multiple programs as well as associated documentation.

Software comprises for example one or multiple programs and for example associated documentation and for example additional data, which (programs and/or documentation and/or data) are necessary for operating a computer.

In one specific embodiment, the check is performed by the server. This makes it possible to check efficiently whether or not an update must be performed.

One specific embodiment provides for the server to transmit the update data to the vehicle only when the vehicle is at a standstill. This produces in particular the technical advantage that a communication connection between the server and the vehicle is particularly robust. In particular, this advantageously renders the communication connection particularly stable. In particular, this advantageously produces the effect that a data rate remains approximately constant. For the fact that the vehicle is at a standstill while the update data are being transmitted to the vehicle precludes a situation in which the vehicle for example passes a column that at least partially shadows the radio waves of the communication network.

The standstill of the vehicle comprises in particular that the vehicle is parked, in particular in a parking position. That is to say in particular that one specific embodiment provides for the server to transmit the update data to the vehicle only when the latter is parked in a parking position.

One specific embodiment provides for the vehicle to perform an autonomous parking operation while it is located in the parking facility. The autonomous parking operation comprises in particular that the vehicle parks in a parking position, that is, a parking of the vehicle in a parking position. In such an autonomous parking process, a vehicle is normally left by its driver at a drop-off position. From such a drop-off position, the vehicle drives autonomously or in a remote-controlled manner to a parking position of the parking facility and parks there. Following the expiration of a parking period or following a request on the part of the driver or of the parking facility operator, the vehicle drives autonomously or in a remote-controlled manner from the parking position to a pick-up position, where the driver is able to pick up his vehicle. The pick-up position may be in particular identical to the drop-off position. Such an autonomous parking operation may also be called AVP ("automatic valet parking" in English) and may be translated as "automatic parking operation." Such an autonomously driving vehicle, which is able to park and unpark automatically is called an AVP vehicle, for example.

That is to say, in particular, that according to one specific embodiment the vehicle is an AVP vehicle. An AVP vehicle thus has in particular an autonomous parking functionality.

Autonomous in the sense of the present invention means in particular that the vehicle navigates or drives independently, that is, without an intervention of a driver, in the parking facility. The vehicle thus drives independently in the parking facility without a driver having to control the vehicle for this purpose.

A parking facility in the sense of the present invention may also be called a parking area and used as an area for parking vehicles. The parking facility thus forms in particular a contiguous area, which has multiple parking spaces (in the case of a parking lot on private property) or parking stalls (in the case of a parking lot on public property). According to one specific embodiment, the parking facility may be comprised by a car park. In particular, the parking facility is comprised by a parking garage.

One specific embodiment provides for the establishment of an additional communication connection between the server and an additional server, the server receiving the update data from the additional server via the additional communication connection in order to transmit the update data via the communication connection to the vehicle. This produces in particular the technical advantage that it is not necessary for the server itself to have stored the update data. The latter are stored on the additional server or the additional server is able to access these update data. This makes it possible to operate the server itself efficiently and with a reduced memory requirement.

According to one specific embodiment, the additional server is a server of an OEM, that is, of an original equipment manufacturer. In particular, the additional server is a server of an OEM inspection provider. Such a provider, for example, performs an inspection of the vehicle, that is, in particular of vehicle systems, online, that is, via the communication connections.

One specific embodiment provides for establishing an additional communication connection between the server and an additional server.

One specific embodiment provides for establishing an additional communication connection between the server and an additional server, the check being performed by the additional server.

The additional server is thus able to access the vehicle remotely in particular via the additional communication connection and via the communication connection in order to perform for example an error analysis of the processing device and/or to upload update data for example.

One specific embodiment provides for the server itself to supply the update data. That is to say that the update data are stored on the server or that a database is provided, which the server is able to access, the update data being stored in the database.

One specific embodiment provides for the check to determine whether the processing device has a malfunction and/or whether the processing device had a malfunction and, if yes, whether an update of the software suffices to rectify the malfunction. This produces in particular the technical advantage of making it possible to detect a malfunction efficiently. This produces in particular the technical advantage of making it possible efficiently to detect whether the update of the software suffices to rectify the malfunction. Such a recognition advantageously allows for a safe operation of the vehicle.

One specific embodiment provides for the server to perform at least one of the following actions if the update of the software does not suffice to rectify the malfunction:
  transmitting a message to a keeper and/or to a driver of the vehicle, in order to inform the keeper and/or driver about this fact,
  transmitting a message to a workshop of a keeper and/or driver of the vehicle in order to inform the workshop about this fact,
  blocking and/or limiting at least one driving function of the vehicle that concerns the malfunction,
  transmitting a message to a roadside assistance service in order to order the roadside assistance service to repair the malfunction,
  transmitting a message to a pick-up service so as to order the pick-up service to pick up the vehicle.

The transmission may be performed for example via the communication network and/or via an additional communication network.

The transmission of the message to the keeper and/or to the driver of the vehicle, in order to inform the keeper and/or driver of this fact, produces in particular the technical advantage that the latter is/are able to become cognizant of the fact that the update of the software does not suffice to rectify the malfunction.

The transmission of the message to the workshop, in order to inform the workshop of this fact, in particular has the technical advantage that the workshop becomes cognizant of the fact that the update of the software does not suffice to rectify the malfunction. Accordingly, the workshop is able advantageously to take preparatory measures to rectify the malfunction when the vehicle is on location in the workshop.

Blocking and/or limiting the driving function of the vehicle pertaining to the malfunction has in particular the technical advantage of allowing the vehicle to be operated safely. For this advantageously makes it possible to prevent the recurrence of the malfunction or, if it should occur, to ensure a less critical effect due to the limitation.

The transmission of the message to the roadside assistance service in particular has the technical advantage that the roadside assistance service is able to repair the malfunction on site, that is, while the vehicle is in the parking facility. Thus, it is not necessary for a driver of the vehicle to drive to the workshop for repair.

The transmission of the message to the pick-up service in particular has the technical advantage that the driver personally does not have to take care of this matter. The driver thus saves time.

In the event that the update suffices, another specific embodiment provides for a message to be transmitted to a keeper and/or a driver of the vehicle by way of the server in order to inform the latter of this fact and/or in order to request from the latter a confirmation for a performance of the update or for ordering the roadside assistance service or the pick-up service. This produces in particular the technical advantage that the keeper and/or the driver must confirm explicitly when the software is to be updated or when the roadside assistance service or the pick-up service are to be ordered. There is then in particular a provision that the software is only updated or the roadside assistance service or the pick-up service are only ordered in response to a confirmation on the part of the keeper and/or on the part of the driver.

Another specific embodiment provides for the malfunction to affect an autonomous driving functionality, in particular an autonomous parking functionality. This produces in particular the technical advantage of making it possible to detect whether an autonomous driving functionality, in particular an autonomous parking functionality, is operating correctly or incorrectly.

One specific embodiment provides for the server to be configured or set up to carry out or implement the method for operating a server.

One specific embodiment provides for the server according to the method for operating a server to be the server according to the present invention.

One specific embodiment provides for a communication via the communication network to be encrypted.

In one specific embodiment, the communication network comprises a mobile telephony network and/or a WLAN communication network. Particularly a WLAN communication network is advantageously able to provide a particularly robust, stable and wide-band communication connection.

According to one specific embodiment, the communication infrastructure comprises one or more access points (wireless access point, base station). That is to say that for example multiple WLAN base stations and/or multiple mobile telephony base stations, for example LTE base stations (LTE: long term evolution), are situated in the parking facility.

Device features result analogously from corresponding method features and vice versa. That is to say that technical functionalities concerning the method derive from corresponding functionalities concerning the device and vice versa.

That is to say in particular that one specific embodiment provides for the processor to be configured to carry out the technical method steps according to the method in such a way that it controls the communication interface accordingly.

One specific embodiment thus provides for the processor to be configured to ascertain or produce the aforementioned messages, the communication interface then being configured in particular to transmit these messages or one of the messages via the communication network for example to the roadside assistance service and/or for example to the pick-up service and/or for example to the workshop and/or for example to the keeper and/or to the driver.

One specific embodiment accordingly provides for the communication interface to be accordingly configured to receive a confirmation.

The present invention will be explained in greater detail in the following with reference to the exemplary embodiments.

DETAILED DESCRIPTION

Figure 1:
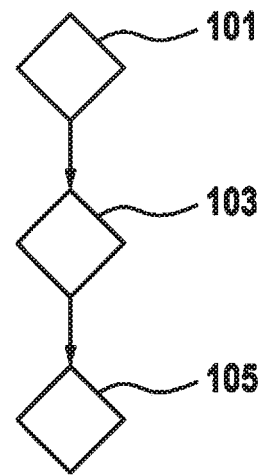
FIG. 1 shows a flow chart of a method for operating a server.

FIG. 1 shows a flow chart of a method for operating a server. The method comprises the following steps:

establishing 101 a communication connection between the server and a vehicle located in the parking facility via a communication network, the communication network being formed by a communication infrastructure of the parking facility, checking 103 via the communication connection whether a software stored in a processing device of the vehicle must be updated, transmitting 105, depending on the result of the check, update data to the vehicle for updating the software via the communication connection by using the server so as to make it possible to update the software based on the update data, while the vehicle is located in the parking facility.

One specific embodiment provides for the check to be performed by the server.

Another specific embodiment provides for establishing another communication connection between the server and an additional server, the server receiving the update data from the additional server via the additional communication connection in order to transmit the update data via the communication connection to the vehicle.

One specific embodiment provides for the additional server to perform the check.

Figure 2:
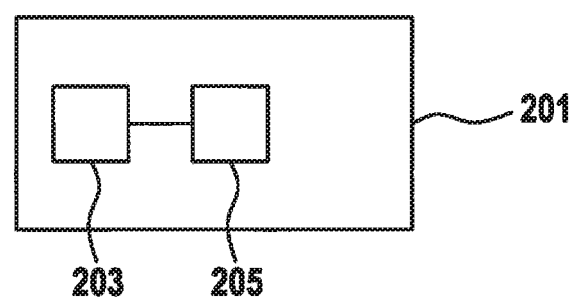
FIG. 2 shows a server.

FIG. 2 shows a server 201.

Server 201 comprises:
- a communication interface 203, which is configured to communicate via a communication network that is formed by a communication infrastructure of the parking facility.
- a processor 205, which is configured to control the communication interface 203 in such a way that communication interface 203 establishes a communication connection between server 201 and the vehicle located in a parking facility via the communication network,
- so that it is possible to check via the communication connection whether a software stored on a processing device of the vehicle must be updated,
- the processor 205 being configured to control communication interface 203 as a function of the check in such a way that communication interface 203 transmits update data to the vehicle for updating the software via the communication network so as to make it possible to update the software based on the update data while the vehicle is located in the parking facility.

One specific embodiment provides for server 201 to be configured or set up to carry out or implement the method for operating a server.

Figure 3:
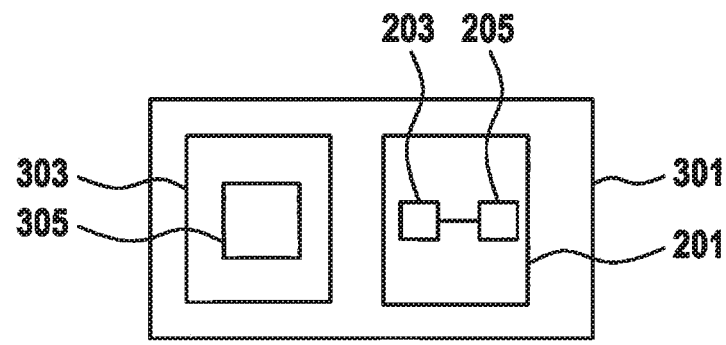
FIG. 3 shows a parking system for vehicles.

FIG. 3 shows a parking system 301 for vehicles.

Parking system 301 comprises:
- a parking facility 303,
- which has a communication infrastructure 305,
- which is configured to form a communication network, and
- the server 201 as shown in FIG. 2.

The present invention thus comprises in particular and inter alia the idea of providing a technical and efficient concept that allows for a regular inspection analysis including a possibly necessary uploading of software updates. The regularity in this context may signify up to multiple times daily. This applies in particular during each AVP parking operation.

The analysis and the installation of possibly necessary software updates are provided in particular via a WLAN communication connection, which is advantageously a robust, stable and wide-band communication connection.

According to one specific embodiment, the check and the transmission of the update data occur, if necessary, during the parking operation, in particular during the autonomous parking operation. In particular, the check and the possibly necessary transmission of update data are performed while the vehicle is at a standstill. That is to say in particular that the method is performed only when the vehicle is parked or is standing still. This additionally ensures further that the installation of software, that is, in particular of the update data, is not endangered due to a break in the communication connection.

According to one specific embodiment, the server is comprised by a parking facility management system or parking facility administration system. Such a parking facility management system manages in particular the parking facility, that is, it operates the parking facility and coordinates for example the AVP operations of AVP vehicles.

According to one specific embodiment, the server, in particular the parking facility management system, takes on the functionality of an OEM inspection provider. That is to say that, according to this specific embodiment, the server performs both the check as well as the transmission of update data. According to another specific embodiment, the server, in particular the parking facility management system, is connected to an OEM inspection provider (cf. specific embodiments concerning the additional server and the additional communication connection), this OEM inspection provider performing the check and transmitting the update data to the server so that the latter is then able to relay the received update data to the vehicle.

According to one specific embodiment, the server, in particular the parking facility management system, is connected to all and/or various and/or multiple OEMs.

This ensures in particular that the newest inspection analyses and software updates are always available.

Another specific embodiment provides that specifically the components and/or functions necessary for an AVP operation are analyzed and, if necessary, updated.

If errors and/or necessary software updates are ascertained in an analysis, then there may be a provision for the update data to be transmitted to the vehicle. That is to say that the software updates may be uploaded.

In the event that the software updates do not suffice to rectify the found errors, at least one or multiple of the following actions are triggered or carried out:
- informing the keeper/driver (immediately or when picking up the vehicle) about the error (for example, a message is transmitted to a mobile terminal of the keeper/driver),
- informing the "standard" workshop of the keeper/driver (the information including the information about the error), so that it is able to make arrangements with the driver/keeper for an appointment and is able to procure possibly necessary materials,
- possibly "blocking" and/or limiting the vehicle with respect to the driving behavior if a serious error exists,
- ordering an immediate service on site (which may be in consultation with the keeper),
- ordering a pick-up service (for example in order to transfer the vehicle to a workshop).

In the event that the software updates suffice, at least the keeper/driver is informed, according to one specific embodiment. According to one specific embodiment, prior to the operation (that is, prior to an update, in particular prior to transmitting the update data), a permission/an order for this service is obtained from the driver/keeper.

What is claimed is:

1. A method for operating a server, the method comprising:
   establishing a communication connection between the server and a vehicle located in a parking facility via a communication network, the communication network being formed by a communication infrastructure of the parking facility;
   checking via the communication connection whether a software stored in a processing device of the vehicle must be updated; and
   transmitting, depending on the result of the check, update data for updating the software to the vehicle via the communication connection using the server, so as to provide for updating the software based on the update data while the vehicle is located in the parking facility, wherein the checking and the transmitting are performed during a stage in an autonomous parking operation of the vehicle in which the vehicle is autonomously controlled to be in motion in the parking facility.

2. The method of claim 1, wherein another communication connection is established between the server and an additional server, the server receiving the update data from the additional server via the additional communication connection in order to transmit the update data via the communication connection to the vehicle.

3. The method of claim 1, wherein the check includes determining whether the processing device has a malfunction and/or whether the processing device had a malfunction and, if so, whether updating the software suffices to correct the malfunction.

4. The method of claim 3, wherein, if the update of the software does not suffice to correct the malfunction, at least one of the following actions are performed using the server:
transmitting a message to a keeper and/or to a driver of the vehicle, in order to inform the keeper and/or driver about this fact,
transmitting a message to a workshop of a keeper and/or driver of the vehicle in order to inform the workshop about this fact,
blocking and/or limiting at least one driving function of the vehicle that concerns the malfunction,
transmitting a message to a roadside assistance service so as to order the roadside assistance service to repair the malfunction,
transmitting a message to a pick-up service so as to order the pick-up service to pick up the vehicle.

5. The method of claim 3, wherein, if the update of the software suffices, a message is transmitted to a keeper and/or to a driver of the vehicle using the server to inform the latter about this fact and/or to request from the latter a confirmation for a performance of the update or for ordering the roadside assistance service or the pick-up service.

6. The method of claim 3, wherein the malfunction affects an autonomous driving functionality and/or an autonomous parking functionality.

7. A server, comprising:
a communication interface to communicate via a communication network that is formed by a communication infrastructure of a parking facility;
a processor to control the communication interface so that the communication interface establishes a communication connection between the server and the vehicle located in a parking facility via the communication network, so that it is possible to check via the communication connection whether a software stored on a processing device of the vehicle must be updated;
wherein the processor is configured to control the communication interface as a function of the check so that the communication interface transmits update data for updating the software to the vehicle via the communication connection so that the software may be updated based on the update data while the vehicle is located in the parking facility;
wherein the check and the transmission of the update data are performed during a stage in an autonomous parking operation of the vehicle in which the vehicle is autonomously controlled to be in motion in the parking facility.

8. A parking system for vehicles, comprising:
a parking facility having a communication infrastructure to form a communication network; and
a server, including:
a communication interface to communicate via a communication network that is formed by a communication infrastructure of a parking facility;
a processor to control the communication interface so that the communication interface establishes a communication connection between the server and the vehicle located in a parking facility via the communication network, so that it is possible to check via the communication connection whether a software stored on a processing device of the vehicle must be updated;
wherein the processor is configured to control the communication interface as a function of the check so that the communication interface transmits update data for updating the software to the vehicle via the communication connection so that the software may be updated based on the update data while the vehicle is located in the parking facility;
wherein the check and the transmission of the update data are performed during a stage in an autonomous parking operation of the vehicle in which the vehicle is autonomously controlled to be in motion in the parking facility.

9. A non-transitory computer readable medium having a computer program, which is executable by a processor, comprising:
a program code arrangement having program code for operating a server, by performing the following:
establishing a communication connection between the server and a vehicle located in a parking facility via a communication network, the communication network being formed by a communication infrastructure of the parking facility;
checking via the communication connection whether a software stored in a processing device of the vehicle must be updated; and
transmitting, depending on the result of the check, update data for updating the software to the vehicle via the communication connection using the server, so as to provide for updating the software based on the update data while the vehicle is located in the parking facility, wherein the checking and the transmitting are performed during a stage in an autonomous parking operation of the vehicle in which the vehicle is autonomously controlled to be in motion in the parking facility.

* * * * *